…

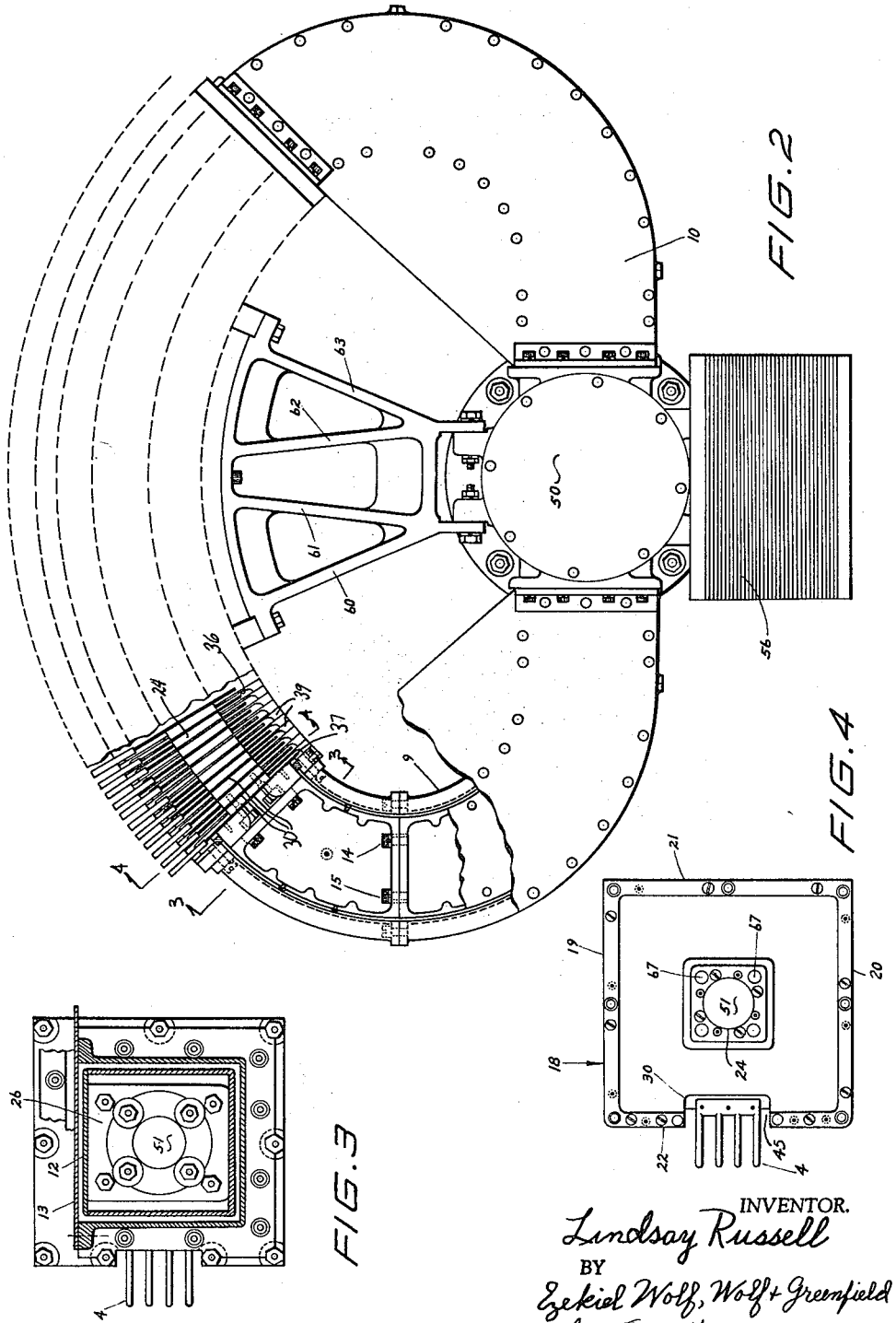

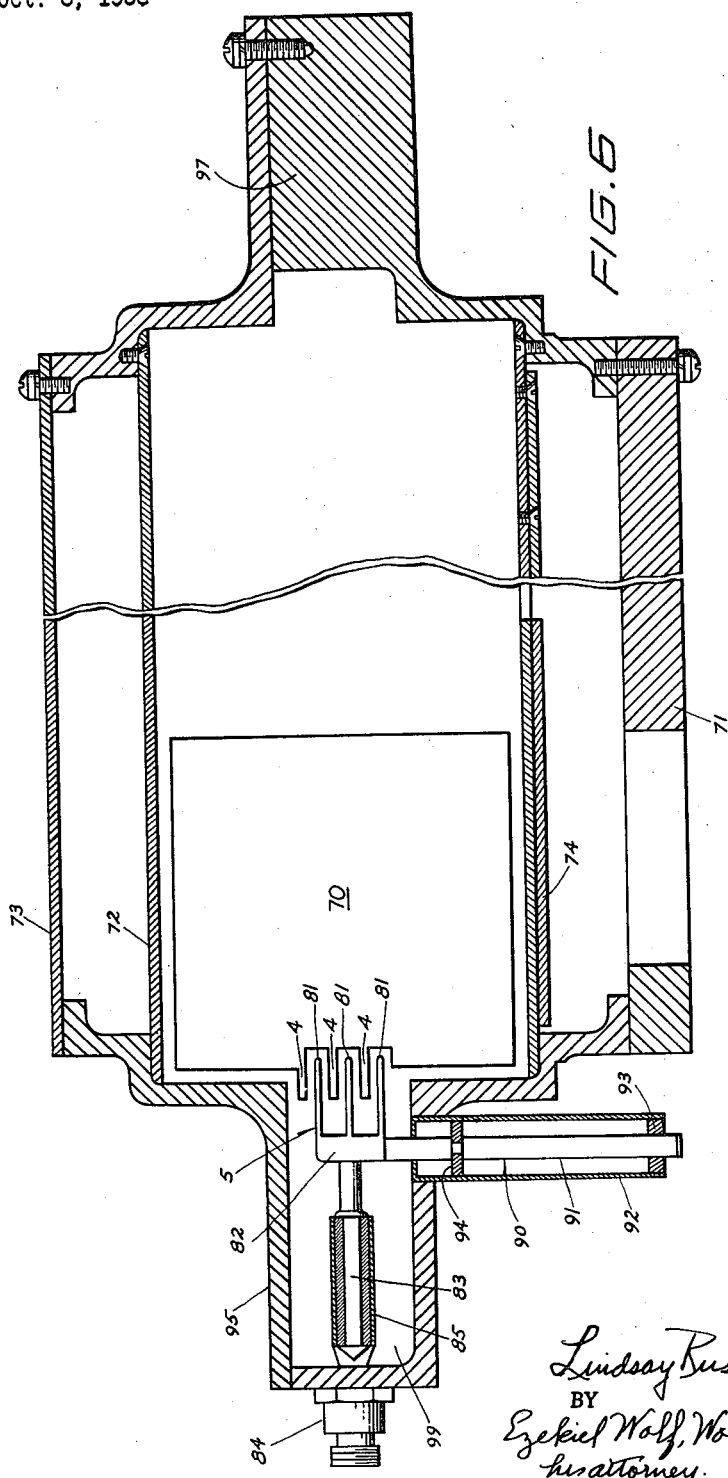

United States Patent Office 3,145,352
Patented Aug. 18, 1964

3,145,352
ROTARY DISTRIBUTOR, HAVING TIME-DELAY LINE IN ROTOR, FOR SIMULTANEOUSLY DISTRIBUTING INPUT, AT DIFFERENT DELAYS, TO SPACED STATOR POINTS
Lindsay Russell, Cambridge, Mass., assignor to Andrew Alford, Boston, Mass.
Filed Oct. 8, 1958, Ser. No. 766,643
10 Claims. (Cl. 333—7)

The present invention relates to a phasing system and more particularly to a system for feeding power from a single source to a multiplicity of terminals adapted for example, to be connected to individual antennas in an array with the power supplied in controlled phase and amplitude and in substantially non-discreet increments.

While the present invention may have several applications, for convenience it will be described in connection with a phasing system for a radially arranged array of transmitting antennas. It will be recognized however that the principles herein disclosed are not only applicable to the specific construction discussed but can be applied equally well in many other cases as for example in an array for receiving signals.

In the present invention there is provided a means for selectively transferring large amounts of power from a single power source to a multiplicity of terminals in controlled phase relation and amplitude, and with the system adapted to operate over a broad band of frequencies with substantially uniform transfer characteristics.

More particularly in the present invention there is provided a stator and a rotor with the rotor having an arcuate artificial delay line fed at its outer ends from the axis of rotation of the rotor. The delay line is constructed so as to provide a particularly desired velocity of propagation of the wave along the delay line as well as a particularly selected characteristic impedance. Power fed into the delay line is coupled to a plurality of radially arranged terminals fixed to the stator by means of a plurality of series capacitors. Each capacitor is in series with and between the rotor and the stator with one half of each capacitor connected to a terminal and the other half to the inner conductor of the delay line. A capacitive coupling for transfer of power from the rotor to the terminals opposite the rotor is effected through these series capacitors.

The series capacitors are particularly designed to effect a smooth transfer on the rotation of the rotor. These series capacitors eliminate the necessity of a mechanical contact or the utilization of resistors which might otherwise affect a smooth rotation of the rotor and of the power transmission.

The present invention is also designed to provide a phasing system for transfer of substantial power to an antenna array for emitting a rotating signal beam without the necessity of rotating the antennas themselves but in such a manner as to permit a maximum transfer of energy in substantially non-discretely advancing power increments.

In addition the present system is so constructed as to permit air cooling of the delay line and adjacent portions of the stator in such a manner as to effectively accommodate heat from power losses.

Further the delay line is so constructed as to provide large shunt capacitors which substantially raise the high voltage break-down point of the delay line.

These and other objects and advantages of the present invention will be more clearly understood when considered in conjunction with the accompanying drawings, in which:

FIGURE 2 is a fragmentary detail of the delay line and rotor.

FIGURE 3 is a cross section taken along the line 3—3 of FIGURE 2.

FIGURE 4 is a cross section taken along the line 4—4 of FIGURE 2.

FIGURE 5 is a fragmentary cross section of the stator taken along the line 5—5 of the schematic view of FIGURE 1, and FIGURE 6 is a fragmentary cross sectional view of the stator taken along the line indicated at 6—6 in the schematic view of FIGURE 1.

Figure 1:
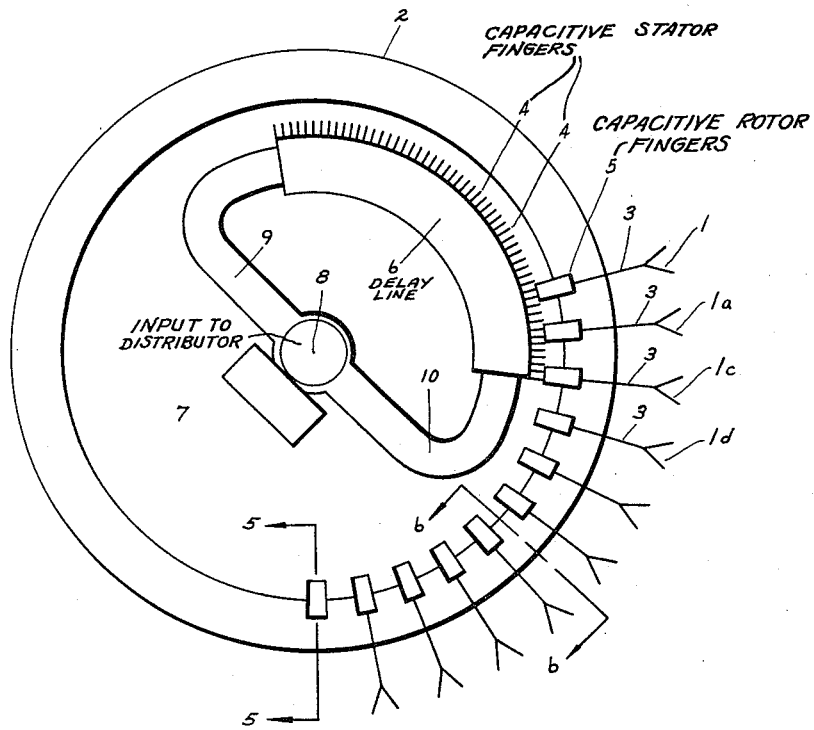
FIGURE 1 is a top schematic view of the present invention.

The overall construction of the present invention may best be understood from a consideration of FIGURE 1. Here a plurality of transducers such as transmitting antennas, 1, 1a, 1c, etc., are connected by transmission lines 3 to the stator 2. In the particular configuration fragmentarily shown for example in FIGURE 2, ninety-six such antennas may be connected to the stator. However, other numbers depending on design selection may be used. The transmission lines 3 are connected to metal plates 5 at their inner end, each of which forms one-half of a series capacitor, with the other half of the series capacitor formed by smaller plates or projections indicated at 4, which are connected to the inner conductor of the delay line indicated at 6. The delay line 6 forms a portion of the rotor 7. Power is fed into an output in the rotor through a suitable non-contacting rotary joint in a transmission line at 8. The joint at 8 is formed in a T, dividing the power supplied through the joint preferably equally into the symmetrical branches 9 and 10 of a transmission line.

The branches 9 and 10 are connected to opposite outer ends of the delay line 6. The delay line 6 is so constructed as to provide a controlled delay in the propagation of the wave from the ends of the delay line to the center and also to provide a selected characteristic impedance. The power thus propagated through the branch lines 9 and 10 into the delay line 6 is coupled in selected phase and amplitude through the plates 5 and opposite plates 4 acting as a series capacitor and thence to the transducers 1, 1a, etc., by proper construction of the delay line 6, the power transferred to the antennas 1, 1a, etc., may be used to provide a sharp radiation lobe with substantially no side lobes. However, this lobe may be continuously rotated with substantially no stepping effect as power is transferred from one antenna to the adjacent antenna on movement of the rotor.

The rotor is more clearly shown in FIGURE 2. In this arrangement, the rotor is suitably mounted on a base for rotation with a driving means such as a constant speed motor (not shown), adapted to rotate this rotor at a selected rate, as for example, 120 r.p.m. The motor may be suitably coupled to the rotor by any conventional gearing means. Power is supplied to the rotor through a transmission line having a non-contacting rotating joint which is not shown. The upper portion of the joint is connected as a T with the coaxial transmission line branches 9 and 10. The transmission lines 9 and 10 are similar in construction and provide a cross section such as shown in FIGURE 3. In this arrangement there is provided an inner conductor 12 and an outer conductor 13 each of which is substantially rectangular in section with a small gap between the two conductors. The branch transmission lines 9 and 10 may be formed of a series of separate sections joined together at their ends by internally positioned bolt means as illustrated at 14 and 15. These branch transmission lines 9 and 10 extend radially outward from the axial center and at their ends curve towards and into arcuate alignment with one another. The branches 9 and 10 have positioned and connected between them, a phase delay section 6 illustrated in FIG. 1 as having a length equal to a quadrant.

This artificial delay line, which is illustrated in cross section in FIGURE 4, has an outer conductor 18 having top and bottom walls 19 and 20, inner wall 21, and outer wall 22. Outer wall 22 is formed with a gap extending in a horizontal plane, the length of this outer wall 22. The outer conductor 18 may be formed of a series of plates laminated together and suitably connected by a tie rod. The inner conductor 24 extends arcuately from the end plate 26 of the line 9 to a similar plate connected to the end of line 10. This circular cross sectioned inner conductor has mounted on it a series of successively spaced capacitive plates 30. As will be noted these plates are substantially rectangular in cross section and decrease in size from the outer ends of the delay line towards the center, as will be noted by comparison of the inner ends of the plates as indicated at points 36 and 37. Intermediate capacitive plates 30 are capacitive plates 39, which are electrically connected to the outer conductor 18 of the delay line. The specific size of the plates 30 and 39, together with the cross sectional area of the inner conductor 24, may be sized to suitably adjust the velocity of propagation of a wave moving along the delay line and the characteristic impedance of the section so that the relative power distribution in selected magnitude may be obtained along the delay line. This normally will comprise maximum power at the center of the delay line and the minimum power at the end.

The power which is propagated into the delay line is coupled to the antennas 1a, 1c, etc., through the series capacitors 4, 5, which are in part formed by the comb-like capacitor plate 4. These plates 4 each provide a series of pins or prong-like projections, preferably four in number, parallel to one another. The plates 4 are secured electrically by suitable means to the plates 30 so that they are electrically connected to the inner conductor. The plates 4 project outwardly through the slot 45 in the outer conductor 18. For smooth and efficient power transfer, the number of plates 4 per unit length exceed the number of plates which form the other half of the series capacitor 4. In the instant case, there are preferably three plates 4 per unit length for each plate 5 connected to the antenna.

As will be noted the inner conductor 24 is hollow as indicated at 51. This longitudinal opening 51 connects with the interior of the inner conductors of the branches 9 and 10. A continuous passage is provided through the inner conductor of these lines 9 and 10 to the axial center 51 from whence a suitable connection, not shown, may be made to an air blower, thereby assuring passage of air through the interior of the lines 9 and 10 to the inner conductor of the artificial delay line. Openings may be intermediately formed in the inner conductor of the delay line to effect a passage of cooling air outwardly from the delay line through the slot 45. This assures maximum cooling in the overall arrangement. Inasmuch as the rotor is formed of substantially a quadrant section, a counter-balancing mass indicated at 56 is provided to facilitate the rapid rotation of the rotor. This counter-balancing mass 56 may be secured to the frame of the rotor by any suitable means. If desired, the construction of the rotor may be reinforced by means of supporting arms 60, 61, 62 and 63, which rigidly interengage the center section 50 of the rotor with the delay line 6.

A plurality of tie rods as indicated for example at 67, may also be provided for suitably securing the successive sections of the delay lines and their capacitor plates together.

The stator is more clearly shown in FIGURES 5 and 6, with the position of the delay line shown schematically at 70. The stator is formed with a base 71 as well as cover members 72 and 73. The annular plate 74 horizontally positioned just below the rotor serves to act as a filter and is maintained at low impedance which prevents passage of power through the bearings as it helps in directing power towards the terminals. The plates 4 are adapted on rotation of the rotor to successively interleave adjacent plates 5 radially arranged about and secured to the stator. Each of these plates 5, preferably comprise a group of three flat parallel plates 81, closely spaced and adapted to have passed between them, successively, successive sets of pins 4. The plates 81 are connected together by means of conductive cross members 82 which is electrically continuous with the inner conductor 83. The inner conductor in turn is connected to a terminal 84 to which the transmission line of an antenna may be connected. The inner conductor 83 is provided with a sleeve dielectrically spaced from and parallel to the inner conductor 83, forming a series capacitance with the series capacitance formed by the plates 81 and the plates 4 closely adjacent the plates 81. Also provided is a shunt inductance 90 formed by the rod 91 and the outer conductor 92. It will be noted the conductors 91 and 92 are spaced apart by means of the dielectric spacers 93 and 94. The outer conductor of the stator forms a balanced line with the inner conductor 83. The adjacent inner conductors are each shielded from each other by wall segments indicated at 97 in FIGURE 6, these wall segments forming a series of radial partitions between the recesses 99.

The plates 81 are coupled to adjacent plates 4 with maximum coupling between the most closely adjacent plates and lesser coupling to the more remote plates 4. Thus, as the rotor is turned three successive plates 4, for example, have significant coupling to a plate 5 with the coupling gradually decreasing between the leading plate 4 and increasing gradually with the trailing plates 4. As the rotor continues to turn the leading plate 4 is no longer coupled to the first mentioned plate 5, but begins to become coupled with the next successive plate 5. Simultaneously another plate 4 begins to become coupled. Thus by this arrangement, the power is coupled gradually from the delay line to successive antenna terminals with substantial smoothness and without the need of a resistance coupling. This arrangement thereby may be used to achieve an essentially smooth rotation of a beam signal in which the particular shape of the beam may be varied by selective design of the delay line.

Having now described my invention, I claim:

1. A phasing system comprising a stator having a plurality of radially arranged terminals, a rotor having a delay line extending along an arcuate sector of said rotor, said delay line having slotted outer conductor and a hollow inner conductor with projections extending through the wall of said outer conductor, coaxial transmission lines in series with each end of said delay line and connected to common feed and having hollow inner conductors through which air may be forced for cooling said system, the hollow portions of said inner conductors being continuous, and means including said projections for coupling power from said delay line to said terminals.

2. A phasing system comprising a stator having a plurality of radially arranged terminals, a rotor having a delay line extending along an arcuate sector of said rotor, said delay line having an outer conductor with a peripheral arcuately extending slot formed therein normal to the rotor's axis and an inner conductor having projections extending outwardly therefrom towards said slot, plates connected to said terminals and projecting parallel to said projections adapted to overlap and form series capacitors on rotation of said rotor, and coaxial transmission lines in series with each end of said delay line and connected to a common feed.

3. In a phasing system having a rotor with an arcuately disposed delay line and a stator having a plurality of circumferentially displaced terminals, coupling means for feeding power to and from said terminals comprising circumferentially displaced plate means coupled to each terminal, a plurality of circumferentially displaced projections from said delay line in arcuate longitudinal alignment at a distance apart no greater than the distance between adjacent plates, said projections adapted to be rotated in a plane parallel to a plane in which said plates are positioned and adapted when rotated to overlap said plates and thereby form a succession of circumferentially displaced series capacitors between said terminals and delay line.

4. In a phasing system having a rotor with an arcuately disposed delay line and a stator having a plurality of circumferentially displaced terminals, coupling means for feeding power to and from said terminals comprising series capacitors formed of plates and circumferentially displaced projections, said plates connected one each in series with each terminal and radially arranged in the same plane, said projections connected in arcuate longitudinal alignment to successive points in said delay line, and radially arranged in the same plane with the plane of said plates and the plane of said projections spaced closely, whereby on rotation of said rotor consecutive groups of said terminals will be capacitively coupled to said delay line as it is rotated by said plate.

5. A device as set forth in claim 4 wherein each of said plates and corresponding terminals are connected in series with an intermediate capacitor and a shunt inductance is connected intermediate said plate and capacitor.

6. A device for feeding power from a common source, to a plurality of terminals in controlled amplitude and phase relation, comprising a rotor supporting an arcuate delay line at its periphery, a stator having a plurality of said terminals radially arranged in planar relation with said delay line, power feed means coupled to said delay line at either end thereof, said delay line having inner and outer conductors with the outer conductor having a slot extending longitudinally on the outer periphery thereof, said inner conductor having a plurality of shunt capacitive plates coupled to a plurality of capacitive plates connected to said outer conductor with the plates of varied sizes for affecting the impedance of said line, and coupling means for coupling said terminals and delay line.

7. A device as set forth in claim 6 wherein said coupling means comprises a plurality of coplanar plate means connected one each to each terminal with said plate means each comprising a plurality of parallel plate elements connected together at one end, and a plurality of coplanar projection means connected to successive sections of said inner conductor and spaced apart substantially less than the distance between successive plate means, with said projection means each comprising a plurality of parallel plate elements connected together at one end, said plate elements and projection elements adapted to interleave with one another as said rotor moves, whereby a capacitive coupling is formed between adjacent plate and projection elements.

8. Phase shifting apparatus comprising, a plurality of insulatedly separated conducting plates spaced along a path, a tapped delay line having a conducting projection extending from each tap across said path with a group of said projections cooperating with a group of said plates to establish capacitive coupling therebetween, support means for maintaining said conducting plates in fixed relationship, means for maintaining said support means and said delay line in predetermined relatively movable relationship in which said projections and said plates are relatively displaceable along said path to change the composition of at least one of said groups, first means for exchanging energy with said delay line and a plurality of second means for exchanging energy with respective ones of said plates.

9. Apparatus in accordance with claim 8 wherein said path is the arc of a circle.

10. Apparatus in accordance with claim 8 wherein said first energy exchanging means comprises, a common terminal, and first and second wave transmission means for coupling said common terminal to first and second end terminals respectively of said delay line.

References Cited in the file of this patent
UNITED STATES PATENTS

| | | |
|---|---|---|
| 2,460,401 | Southworth | Feb. 1, 1949 |
| 2,466,354 | Bagnall | Apr. 5, 1949 |
| 2,477,635 | Marchand | Aug. 2, 1949 |
| 2,762,016 | Montani | Sept. 4, 1956 |
| 2,836,821 | Elliott | May 27, 1958 |